United States Patent [19]

Armstrong et al.

[11] 3,973,712
[45] Aug. 10, 1976

[54] UNDERWATER WELDING

[75] Inventors: John Richard Carew Armstrong, Vancouver, Canada; Denis John Marshall, Ware, England

[73] Assignee: BOC International Limited, London, England

[22] Filed: Oct. 16, 1974

[21] Appl. No.: 515,197

[52] U.S. Cl. .................................. 228/57; 228/218
[51] Int. Cl.² ........................................ B23K 28/00
[58] Field of Search ............ 228/57; 29/494, 497.5, 29/157.1 R

[56] References Cited
UNITED STATES PATENTS

| | | | |
|---|---|---|---|
| 2,681,402 | 6/1954 | Muller | 29/494 X |
| 2,770,033 | 11/1956 | Zarth | 29/494 X |
| 3,071,852 | 1/1963 | Rogers | 29/494 X |
| 3,107,895 | 10/1963 | Vögeli | 29/157.1 R X |
| 3,274,677 | 9/1966 | Kilbourn | 29/157.1 R X |
| 3,543,393 | 12/1970 | Cosper | 29/497.5 X |

Primary Examiner—Al Lawrence Smith
Assistant Examiner—Margaret Joyce
Attorney, Agent, or Firm—Dennison, Dennison, Meserole & Pollack

[57] ABSTRACT

Underwater welding apparatus including a welding chamber and at least one source of gas under pressure connected to the welding chamber through a demand valve, in which the demand valve allows the flow of gas to the chamber to increase as the increase in the hydrostatic head causes the pressure of the gas in the chamber to increase, and to decrease as the hydrostatic head decreases.

9 Claims, 2 Drawing Figures

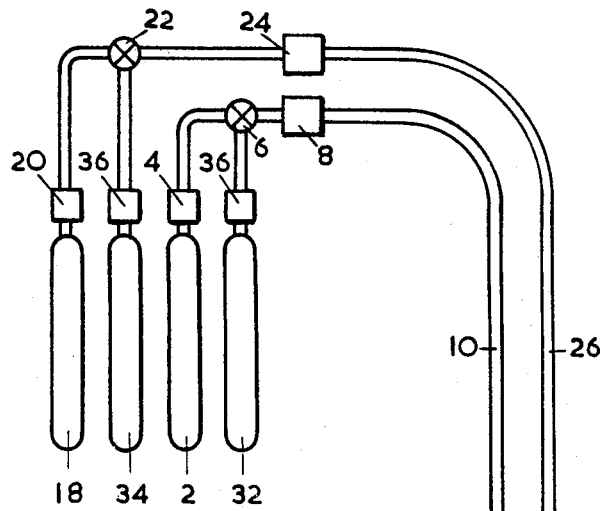
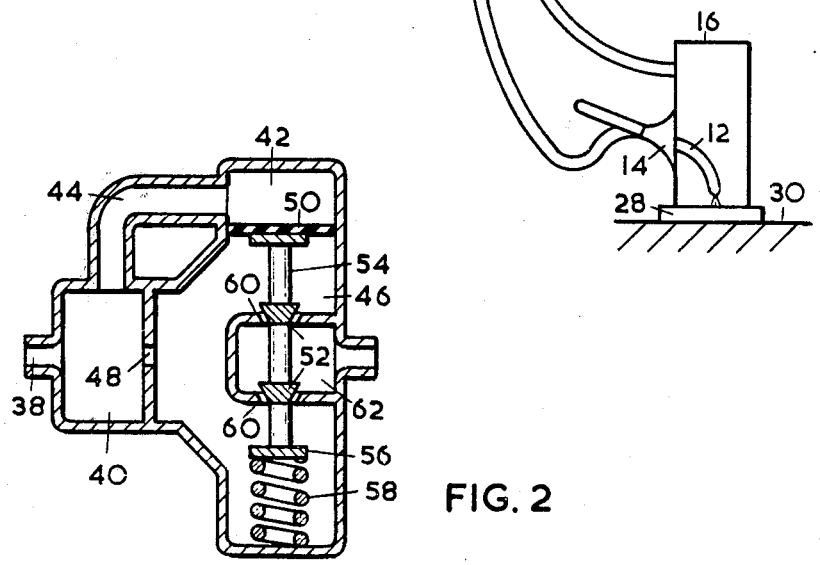

UNDERWATER WELDING

This invention relates to underwater welding, and particularly to underwater welding in a hyperbaric chamber under swell conditions.

When welding in a chamber, it is necessary to keep the pressure of the gas in the chamber slightly higher than the water pressure outside in order to prevent water from flowing into the chamber. This is done by having gas flowing constantly into the chamber. The gas leaks out through a porous seal which rests against the workpiece at one end of the chamber.

In shallow water, under swell conditions, the pressure of water outside the chamber varies greatly. If the pressure of gas in the chamber is kept constant at a value sufficiently high to prevent the water entering the chamber when the water pressure is at a maximum, the difference in pressure between the inside and outside of the chamber will be considerably greater when the water level is at a minimum. This will mean that gas from the chamber will attempt to surge out around the seal and will push the chamber away from the workpiece and make welding almost impossible.

It is the aim of the present invention to provide apparatus for underwater welding in which the rate at which gas leaves the chamber from around the seal varies only slightly even in heavy swell conditions.

Accordingly the present invention provides apparatus which is as claimed in the appended claims.

The present invention will now be described by way of example with the aid of the accompanying drawing, in which:

FIG. 1 is a schematic diagram of one type of underwater welding apparatus of the present invention, and FIG. 2 is a section through a valve which is used to control the flow of gas to the welding chamber in the apparatus shown in FIG. 1.

While welding is in progress, the gas around the weld must be inert since otherwise there is a risk that the weld will be contaminated. Therefore during welding an argon-rich gas mixture from cylinder 2 flows through pressure regulator 4, which ensures that the gas leaving it is at constant pressure, and through two-way valve 6 to demand valve 8. The gas then flows along conduit 10 to the torch 12 which is mounted in a flexible boot 14 on welding chamber 16. Similarly, an argon-rich mixture from cylinder 18 flows through regulator 20 and two-way valve 22 to a second demand valve 24 and along conduit 26 to the chamber 16. The chamber 16 has a porous seal 28 around its lower edge which is pressed into contact with a workpiece 17 during welding. Gas is able to leak out through this seal.

When welding is not in progress, two-way valves 6 and 22 are adjusted so that air from the cylinders 32 and 34 flows through pressure regulators 36 and demand valve 8 and 24 to the torch and the chamber. This prevents waste of the expensive argon-rich gas mixture while ensuring that water does not enter the chamber.

The form of the demand valves 8 and 24 is shown in FIG. 2. Gas at constant pressure enters chamber 40 through inlet 38. A cavity 42 is connected to the chamber 40 through a wide tube 44 so that the pressure of the gas in cavity 42 is approximately the same as the pressure of gas in chamber 40. The chamber 40 is also connected to a low pressure chamber 46 through an aperture 48. A flexible diaphragm 50 separates cavity 42 from low pressure chamber 46. The diaphragm 50 is connected to two valve heads 52 through a member 54 which is also connected to a spring seat 56 for a spring 58. This spring acts to bias the valve heads 52 away from their seats 60. If the difference in pressure between the cavity 42 and the low pressure chamber 46 increases, the diaphragm 50 moves to push the valve heads 52 towards their seats 60 and so closes the valve. Similarly, if the difference in pressure decreases, the diaphragm will move to open the valve. Gas leaves the valve through outlet cavity 62.

The outlet cavity 62 of demand valve 24 is connected to conduit 26. As the pressure outside the chamber 16 increases due to the increasing depth to water, the rate at which bubbles leave the chamber from around the seal 28 decreases and the pressure in the chamber increases slightly. The pressure in outlet cavity 62 of the demand valve will therefore also increase slightly. The rate of gas flow from low pressure chamber 46 to outlet cavity 62 decreases and the pressure in the low pressure chamber 46 increases. The diaphragm 50 therefore moves to open the valve further and more gas is able to flow through the valve. The gas pressure in the chamber therefore increases as the water pressure outside increases.

Similarly, as the water level outside the chamber 16 decreases, the amount of gas leaving the chamber from around the seal 28 will increase and the pressure of gas in the chamber will drop slightly. The corresponding drop in pressure in the outlet cavity 62 will cause more gas to enter cavity 62 from low pressure chamber 46, so that pressure in the low pressure chamber 46 will drop. The diaphragm will therefore move to close the valve and decrease the flow of gas to the chamber 16. The gas pressure in the chamber 16 therefore decreases as the water pressure outside decreases.

The demand valve 8 acts similarly to control the flow of gas to the torch.

This invention is not limited to the use of the exact form of the demand valve described herein. Any valve which allows the flow of gas to increase as the back pressure from the outlet increases, and vice versa may be used.

I claim:

1. Underwater welding apparatus including a welding chamber with at least one boundary surface of the chamber defined by a portion of the workpiece to be welded, a source of gas under pressure in communication with valve means between said chamber and said source of gas, said valve means including demand control means responsive to variations in pressure within said welding chamber caused by variation in pressure externally of said welding chamber to control the flow of gas from said source to the interior of said welding chamber, and selectively increase the flow of gas into said chamber as pressure therein increases, or decrease the flow of gas into said chamber as pressure therein decreases.

2. Underwater welding apparatus as claimed in claim 1, in which the demand control means includes a high pressure chamber connected to the source of gas, a low pressure chamber, a flexible diaphragm between said high and low pressure chambers, said chambers being in communication with each other through means defining a flow impedance interconnecting said high and low pressure chambers, in which said diaphragm is operatively connected to a demand control valve, whereby in response to an increase in the difference in pressure between the high and low pressure chambers, said diaphragm moves the valve to prevent gas leaving the low pressure chamber.

3. Underwater welding apparatus as claimed in claim 2, in which the high pressure chamber is connected to the source of gas under pressure, and the low pressure chamber is connected to the welding chamber.

4. Underwater welding apparatus as claimed in claim 2, in which the demand control valve is biassed away from a valve seat by a compression spring.

5. Underwater welding apparatus as claimed in claim 1, in which a welding torch is mounted in a flexible boot on the welding chamber.

6. Underwater welding apparatus as claimed in claim 5, in which there are two sources of gas and two demand control means, the outlet of the first being connected directly to the welding chamber and the outlet of the second being connected to the welding torch to provide shielding gas for the weld.

7. Underwater welding apparatus as claimed in claim 1, in which the welding chamber is open at one end and has a porous seal around the said end, which seal is adapted to be pressed into contact with a workpiece during welding.

8. Underwater welding apparatus as claimed in claim 1, in which the gas is an argon-rich mixture of air and argon.

9. Underwater welding apparatus as claimed in claim 6, in which a pressure regulator is located between at least one source of gas and its respective demand control means.

* * * * *